(12) United States Patent
Katou et al.

(10) Patent No.: US 7,697,381 B2
(45) Date of Patent: Apr. 13, 2010

(54) OBJECT LENS DRIVE UNIT

(75) Inventors: Seiichi Katou, Tsuchiura (JP);
Katsuhiko Kimura, Kasumigaura (JP);
Ryuichiro Mizuno, Fujisawa (JP);
Hidenao Saito, Yokohama (JP); Jun Hato, Yokohama (JP)

(73) Assignee: Hitachi Media Electronics Co., Ltd. (JP)

( * ) Notice: Subject to any disclaimer, the term of this patent is extended or adjusted under 35 U.S.C. 154(b) by 764 days.

(21) Appl. No.: 11/527,478

(22) Filed: Sep. 27, 2006

(65) Prior Publication Data
US 2007/0189129 A1    Aug. 16, 2007

(30) Foreign Application Priority Data
Feb. 15, 2006    (JP)    ............... 2006-038364

(51) Int. Cl.
*G11B 7/00*    (2006.01)
(52) U.S. Cl. .................................... 369/44.15
(58) Field of Classification Search ........................ None
See application file for complete search history.

(56) References Cited

U.S. PATENT DOCUMENTS

| 5,301,175 | A * | 4/1994 | Nakamura | 369/44.32 |
| 6,181,670 | B1 * | 1/2001 | Nagasato | 720/681 |
| 6,501,710 | B2 * | 12/2002 | Yokoyama et al. | 369/44.14 |
| 2002/0150002 | A1 * | 10/2002 | Pae et al. | 369/44.16 |
| 2003/0133373 | A1 * | 7/2003 | Kwon et al. | 369/44.16 |
| 2006/0156324 | A1 * | 7/2006 | Ieki et al. | 720/683 |

FOREIGN PATENT DOCUMENTS

| JP | 2002-133688 | 5/2002 |
| JP | 2004-095133 | 3/2004 |

* cited by examiner

*Primary Examiner*—Peter Vincent Agustin
(74) *Attorney, Agent, or Firm*—Antonelli, Terry, Stout & Kraus, LLP.

(57) ABSTRACT

An object lens drive unit in which an undesired displacement or inclination of an object lens with respect to an optical disc is reduced. The position at which a lens holder for the object lens is supported by a pair of rod-shaped elastic support members in the focusing direction substantially coincides with the center of the tracking coil in the focusing direction.

6 Claims, 7 Drawing Sheets

OBJECT LENS DRIVE UNIT

BACKGROUND OF THE INVENTION

1. Field of the Invention

The present invention relates to an object lens drive unit for driving an object lens in an optical disc drive for focusing write/read light on a recording surface of an optical disc.

2. Background Art

Optical disc drives for writing or reading information on optical recording medium discs are capable of recording relatively large volumes of information on such discs. The disc media have large stiffness and are easy to handle. For these reasons, optical disc drives are widely used as an external recording unit for computers or as a device for recording video and audio data. In such optical disc drives, an object lens drive unit is used for driving an object lens, with which the write/read light is focused on the recording surface of an optical disc, in a focusing direction (in which the lens is moved toward or away from the optical disc surface), in a tracking direction (radial direction of the optical disc), in a radial tilt direction (in which the lens is tilted in the radial direction of the optical disc), and in a tangential tilt direction (in which the lens is tilted in a tangential direction to the optical disc). Patent Document 1, for example, discloses such object lens drive unit in a conventional optical disc drive.

As shown in FIG. 1 of Patent Document 1, for example, the conventional object lens drive unit is composed of a moving part including an object lens, support members for supporting the moving part, and a magnetic circuit consisting of a yoke and permanent magnets. The moving part is fitted with a focusing coil and a tracking coil. As a drive current flows through the focusing coil, it interacts with the magnetic flux from the permanent magnets, thereby generating an electromagnetic force. The electromagnetic force drives the moving part in the focusing direction. Similarly, as a drive current flows through the tracking coil, it interacts with the magnetic flux from the permanent magnets, thereby generating an electromagnetic force, with which the moving part is driven in the tracking direction. The moving part is also fitted with a radial tilt coil or a tangential tilt coil. As a drive current flows through the radial tilt coil, it interacts with the magnetic flux from the permanent magnets, thereby generating an electromagnetic force with which the moving part is driven in the radial tilt direction. Similarly, as a drive current flows through the tangential tilt coil, the current interacts with the magnetic flux from the permanent magnet, thereby generating an electromagnetic force with which the moving part is driven in the tangential tilt direction.

In this object lens drive unit, a plurality of support members, which are made of metal cores or the like, are disposed such that they form parallel links. One ends of the support members are fixed to the disposed moving part and the other ends thereof are fixed to a fixing portion. Further, a deformable substrate or the like is interposed on the fixing-portion side of the support members so as to reduce the stiffness of the support members in the axial direction thereof, so that the object lens can be driven in the tangential tilt direction.

Patent Document 1: JP Patent Publication (Kokai) No. 2004-95133 A (pp. 14-25, and FIG. 1)

SUMMARY OF THE INVENTION

As described above, in the conventional object lens drive unit, the stiffness of the support members in the axial direction thereof is reduced so as to enable the driving of the object lens in the tangential tilt direction. As a result, however, the object lens is also allowed to be displaced in a translational direction with respect to the tangential direction. Occasionally, imbalance may be introduced into driving force due to assembly variations in the object lens drive unit. If such imbalance is present in the drive force in the focusing direction or the tracking direction when the support condition is as described above, the object lens would be easily displaced in the tangential direction. Such undesired displacement of the object lens in the tangential direction can be a cause for the deterioration in the state of focus of the optical spot. And such deterioration in the optical spot quality leads to deterioration in a write or read signal.

Particularly in recent years, as the recording density of such discs has increased, the laser wavelength of the write/read light has become shorter and the aperture of the object lens has increased. As a result, if an undesired displacement or inclination occurs in the object lens with respect to the optical disc, even if it is a slight one, the focusing condition of the optical spot would be adversely affected. Therefore, there is a need to further reduce such undesired displacement or inclination of the object lens with respect to the optical disc as compared with conventional object lens drive units.

In view of such problems, it is an object of the invention to provide an object lens drive unit whereby the object lens can be driven in the focusing direction, the tracking direction, the radial tilt direction, and the tangential tilt direction independently, and whereby undesired displacement or inclination of the object lens with respect to the optical disc can be reduced.

In order to achieve the aforementioned object, the invention provides the following.

The invention provides an object lens drive unit comprising: an object lens for focusing light on a recording surface of an optical disc; a lens holder for holding the object lens; a pair of first rod-shaped elastic support members for supporting the lens holder; and a drive means for the lens holder, the drive means comprising: a focusing coil and a tracking coil for driving the lens holder in a direction towards or away from the optical disc and in a radial direction of the optical disc; a radial tilt coil and a tangential tilt coil for causing the lens holder to be inclined in a radial direction and a tangential direction of the optical disc; and magnetic circuit, wherein the position at which the lens holder is supported by the first rod-shaped elastic support members in the focusing direction substantially coincides with the position of the center point of the tracking coil in the focusing direction.

The invention also provides an object lens drive unit comprising: an object lens for focusing light on a recording surface of an optical disc; a lens holder for holding the object lens; a pair of first rod-shaped elastic support members for supporting the lens holder; and a drive means for the lens holder, the drive means comprising: a focusing coil and a tracking coil for driving the lens holder in a direction towards or away from the optical disc and in a radial direction of the optical disc; a radial tilt coil and a tangential tilt coil for causing the lens holder to be inclined in a radial direction and a tangential direction of the optical disc; and a magnetic circuit, wherein the point at which the lens holder is supported by the first rod-shaped elastic support members substantially coincides with the geometric center or the center of gravity of the tracking coil.

The object lens drive unit further comprises at least two pairs of second rod-shaped elastic support members that support the lens holder on the opposite side from the first rod-shaped elastic support members with respect to the tangential direction, wherein the second rod-shaped elastic support members have a smaller axial stiffness than the first rod-shaped elastic support members, wherein the position at which one of the two pairs of the second rod-shaped elastic support members support the lens holder in the focusing direction and the position at which the other pair supports the lens holder in the focusing direction are substantially symmetric with respect to the point at which the first rod-shaped elastic support members support the lens holder.

The object lens drive unit further comprises a pair of third rod-shaped elastic support members that support the lens holder on the opposite side from the first rod-shaped elastic support members with respect to the tangential direction, wherein the third rod-shaped elastic support members have a smaller axial stiffness than the first rod-shaped elastic support members, wherein the position at which the third rod-shaped elastic support members support the lens holder in the focusing direction substantially coincides with the position at which the first rod-shaped elastic support members support the lens holder in the focusing direction.

In the object lens drive unit, the point at which the two pairs of the second rod-shaped elastic support members support the lens holder, the point at which the third rod-shaped elastic support members support the lens holder, and the point at which the first rod-shaped elastic support members support the lens holder do not lie in the same plane perpendicular to the tangential direction.

In the object lens drive unit, the first rod-shaped elastic support members, the second rod-shaped elastic support members, and the third rod-shaped elastic support members are made of electrically conductive material, wherein they each supply current to the focusing coil, the tracking coil, the radial tilt coil, or the tangential tilt coil.

In the object lens drive unit, the end of the second rod-shaped elastic support members opposite to the end thereof at which the lens holder is supported is supported by a fixing portion, wherein the interval of two points at which each pair of the second rod-shaped elastic support members is supported by the fixing portion is narrower than the interval of the two points at which each pair of the second rod-shaped elastic support members supports the lens holder.

Thus, in accordance with the object lens drive unit of the invention, the object lens can be driven in the focusing direction, the tracking direction, the radial tilt direction, and the tangential tilt direction independently, while the undesired displacement or inclination of the object lens with respect to the optical disc is reduced. In this way, the quality of the optical spot can be improved, thereby making it possible to stably read and write optical discs, of which the recording densities are becoming increasingly higher.

DESCRIPTION OF THE PREFERRED EMBODIMENTS

In the following, preferred embodiments of the object lens drive unit according to the invention will be described in detail with reference to the attached drawings. FIGS. 1 to 10 show embodiments of the invention by way of example, throughout which similar numerals designate similar components with basically identical structure and operation. In FIGS. 1 to 10, the x-axis direction indicates the tangential direction of an optical disc (not shown), the y-axis direction indicates the tracking direction, namely, the radial direction of the optical disc, and the z-axis direction indicates the focusing direction, namely, the optical axis direction of an object lens.

First Embodiment

Figure 1:
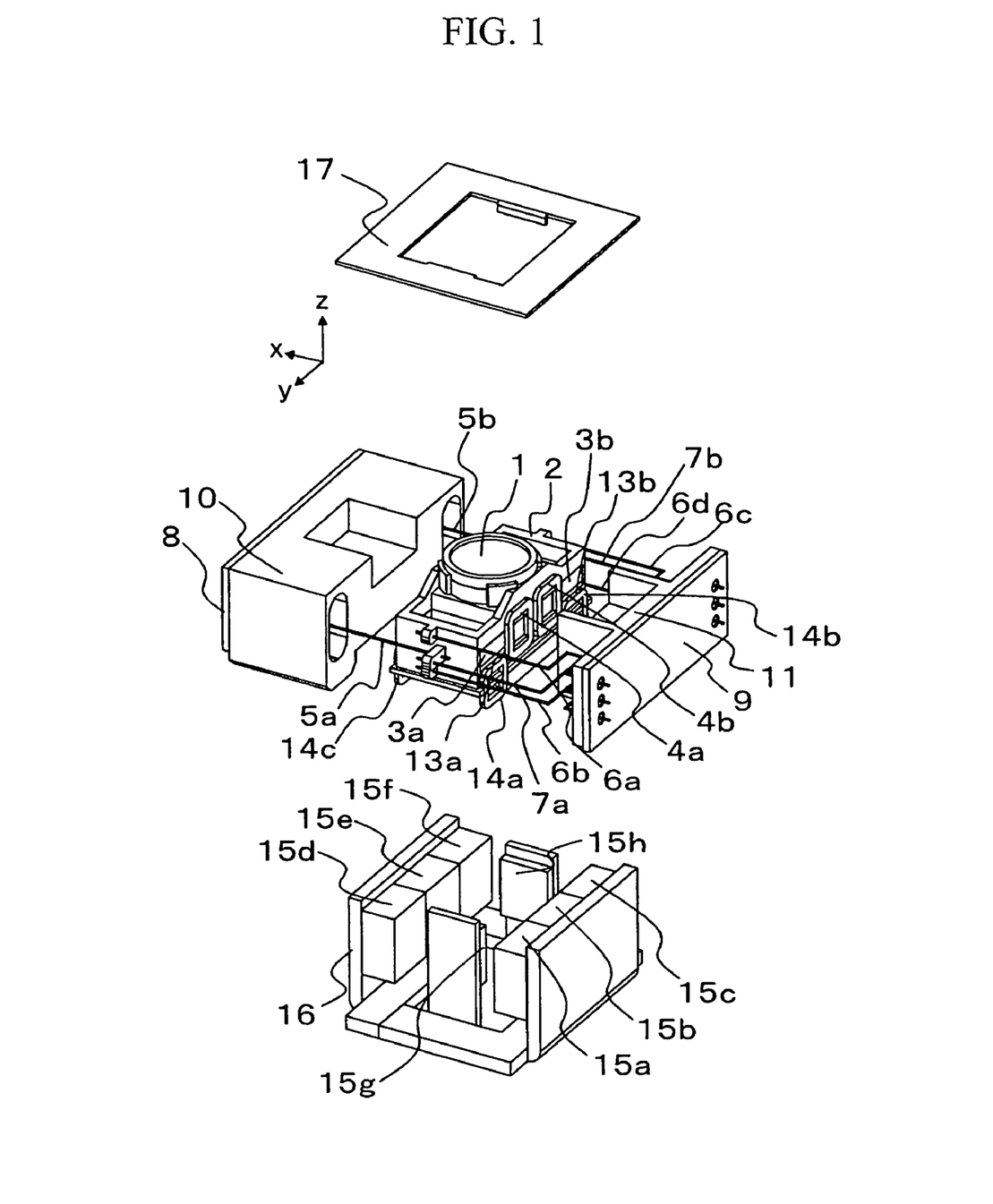
FIG. 1 shows a schematic perspective view of an object lens drive unit according to a first embodiment of the invention.

A first embodiment of the object lens drive unit according to the invention will be described. FIG. 1 shows a perspective view of an object lens drive unit according to the present embodiment. In FIG. 1, the object lens drive unit is composed of an object lens 1, a lens holder 2 for holding the objective lens, means for supporting the lens holder 2, and a group of magnets disposed around the lens holder 2. On the sides of the lens holder 2, there are attached focusing coils 3a and 3b, tracking coils 4a, 4b, 4c, and 4d, radial tilt coils 13a and 13b, and tangential tilt coils 14a, 14b, 14c, and 14d at predetermined positions.

The means for supporting the lens holder 2 is comprised of a first fixing portion 8, a second fixing portion 9, and rod-shaped elastic support members that connect these fixing portions and the lens holder 2. As shown, the lens holder 2 is supported by: first rod-shaped elastic support members 5a and 5b, of which one ends are fixed to the first fixing portion 8; second rod-shaped elastic support members 6a, 6b, 6c, and 6d, of which one ends are fixed to the second fixing portion 9; and third rod-shaped elastic support members 7a and 7b. These rod-shaped elastic support members are electrically conductive, and they serve also to deliver electric current to the focusing coils 3a and 3b, the tracking coils 4a to 4d, the radial tilt coils 13a and 13b, and the tangential tilt coils 14a to 14d.

The positions where the first rod-shaped elastic support members 5a and 5b are attached on both sides of the lens holder substantially coincide with the center (geometric center or the center of gravity) of each of the four tracking coils 4a to 4d. The second rod-shaped elastic support members 6a and 6c are attached at a distance from where the first rod-shaped elastic support members 5a and 5b are attached in the focusing direction. The second rod-shaped elastic support members 6b and 6d are attached at positions symmetric with portions 6a and 6c of the second rod-shaped elastic support members with respect to the positions where the first rod-shaped elastic support members 5a and 5b are attached. The third rod-shaped elastic support members 7a and 7b are attached at positions spaced apart from where the first rod-shaped elastic support members 5a and 5b are attached in the tracking direction (y-axis direction) by a predetermined distance. Thus, the lens holder 2 is supported by the first rod-shaped elastic support members 5a and 5b, the second rod-shaped elastic support members 6a to 6d, and the third rod-shaped elastic support members 7a and 7b on either side of the object lens 1. The second rod-shaped elastic support members 6a to 6d and the third rod-shaped elastic support members 7a and 7b are partly provided with a bend portion or the like so as to reduce their axial stiffness. In the object lens drive unit according to the present embodiment, only the pair of the first rod-shaped elastic support members 5a and 5b is fixed to the fixing part 8. This configuration makes it possible to ensure a certain degree of freedom in the driving of the lens holder 2.

The focusing coils 3a and 3b, the tracking coils 4a to 4d, and the radial tilt coil 13a and 13b are electrically connected to the end of the first rod-shaped elastic support members 5a and 5b, the second rod-shaped elastic support members 6a to 6d, and the third rod-shaped elastic support members 7a and 7b toward their lens holder retaining side, with a conductive fusing material, such as solder. The other end of the first rod-shaped elastic support members 5a and 5b is electrically connected to the first fixing portion 8, and the other end of the second rod-shaped elastic support members 6a to 6d and that of the third rod-shaped elastic support members 7a and 7b are electrically connected to the second fixing portion 9, all with a conductive fusing material, such as solder. To the first fixing portion 8 is fixedly attached a damping holder 10 filled with a viscoelastic material such as silicone, thereby providing damping to the first rod-shaped elastic support members 5a and 5b. The second rod-shaped elastic support members 6a to 6d and the third rod-shaped elastic support members 7a and 7b are coated with a viscoelastic material, such as silicone, at the bend portions thereof, thus providing them with damping.

The moving part is composed of the object lens 1, the lens holder 2, the focusing coil 3, the tracking coil 4, the radial tilt coils 13a and 13b, and the tangential tilt coils 14a to 14d.

Around the lens holder 2, permanent magnets 15a to 15h and yokes 16 and 17 are disposed as a group of magnets for providing the coils with driving force. The permanent magnets 15a, 15b, 15c, 15d, 15e, and 15f are disposed such that their directions of magnetization are opposite in phase between the magnets that are adjacent in the x-axis direction in the drawing. The permanent magnets 15g and 15h are disposed such that their directions of magnetization are the same in phase between their surfaces that are opposite to each other in the y-axis direction in the drawing. The individual magnets 15a to 15h are fixedly attached to the yoke 16, which is a yoke member composed of a magnetic material. To the yoke 16 is attached an upper yoke 17 that functions also as a cover for the object lens drive unit, thereby forming a magnetic circuit. The magnetic circuit provides the object lens drive unit with four degrees of freedom, so that it can be moved in the four directions, namely, in the focusing direction, the tracking direction, the radial tilt direction (x-axis rotating direction), and the tangential tilt direction (y-axis rotating direction).

Figure 2A:
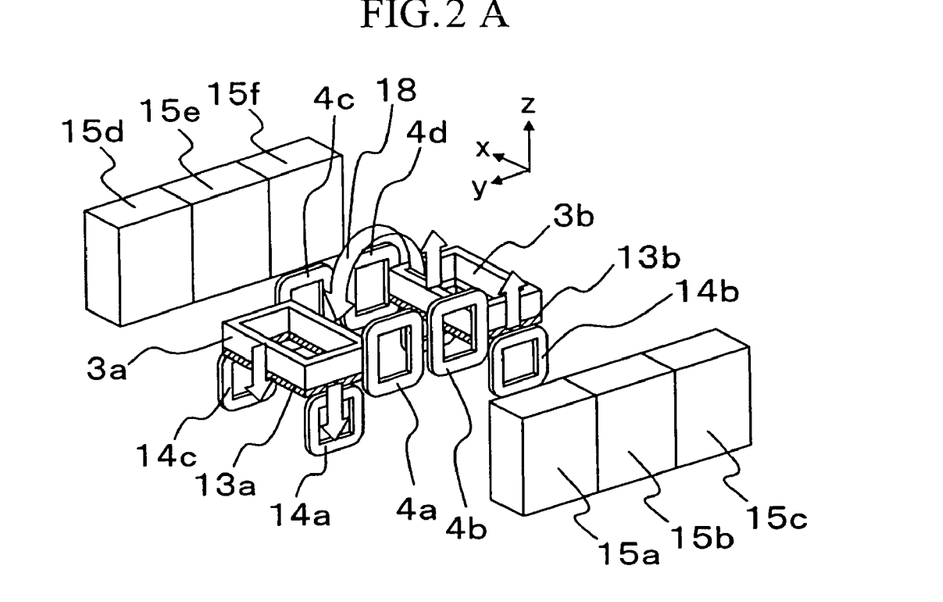
FIG. 2A and FIG. 2B show schematic perspective views illustrating how the object lens drive unit shown in FIG. 1 is driven in the radial tilt direction and the tangential tilt direction.
Figure 2B:
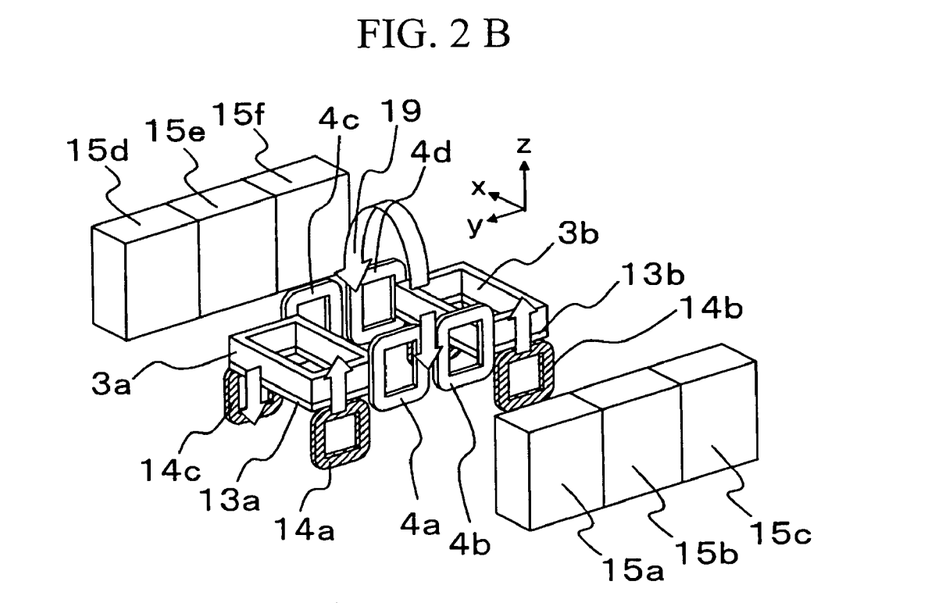

FIG. 2A and FIG. 2B show perspective views of the object lens drive unit according to the present embodiment, illustrating how the object lens drive unit is driven in the radial tilt direction and the tangential tilt direction. FIG. 2A shows the operation in the radial tilt direction, and FIG. 2B shows the operation in the tangential tilt direction.

Referring to FIG. 2A, the coils are wired such that, as a drive current flows through the radial tilt coils 13a and 13b, one radial tilt coil 13b is driven in a z-axis positive direction, while the other radial tilt coil 13a is driven in a z-axis negative direction. As a result, radial tilt moment 18 is caused in the x-axis rotating direction, whereby the object lens 1 is tilted in the radial direction. Similarly, in FIG. 2B, the coils are wired such that, as a drive current flows through the tangential tilt coils 14a to 14d, the two tangential tilt coils 14a and 14b are driven in the z-axis positive direction, while the other two tangential tilt coils 14c and 14d are driven in the z-axis negative direction. As a result, tangential tilt moment 19 is caused in the y-axis rotating direction, whereby the object lens 1 is tilted in the tangential direction. The direction of the moments 18 and 19 can be reversed by changing the direction of the drive current that flows through the radial tilt coils 13a and 13b and the tangential tilt coils 14a to 14d.

As shown in FIG. 1, the first rod-shaped elastic support members 5a and 5b are attached to the lens holder 2 such that one ends thereof substantially coincide with the center (geometric center or the center of gravity) of the tracking coils 4a to 4d, while the other ends thereof are attached to the first fixing portion 8. The first rod-shaped elastic support members 5a and 5b are made of straight wires or the like having a large stiffness in the axial direction thereof. The center of the tracking coils 4a to 4d is made coincident with the center of support where the first rod-shaped elastic support members 5a and 5b are attached to the lens holder 2 so as to reduce the moment that is produced about the support center during tracking drive. In this way, the tilting of the object lens 1 in the radial direction during tracking drive can be reduced. The aforementioned moment is associated with a static tracking drive. In the case of a dynamic tracking drive having frequency components, the positional difference between the center of the tracking coils 4a to 4d and the center of gravity of the moving part would contribute to the moment. Therefore, when the center of the tracking coils 4a to 4d, the support center of the first rod-shaped elastic support members 5a and 5b, and the center of gravity of the moving part are made coincident, all of the moment, both static and dynamic, associated with tracking drive can be reduced, and so the tilting of the object lens 1 in the radial direction can be reduced. Furthermore, since the first rod-shaped elastic support members 5a and 5b have a large stiffness in the axial direction thereof, their displacement in the tangential direction can be minimized, so that the deterioration in quality of the optical spot can be prevented and a good write or read signal can be obtained.

Figure 3A:
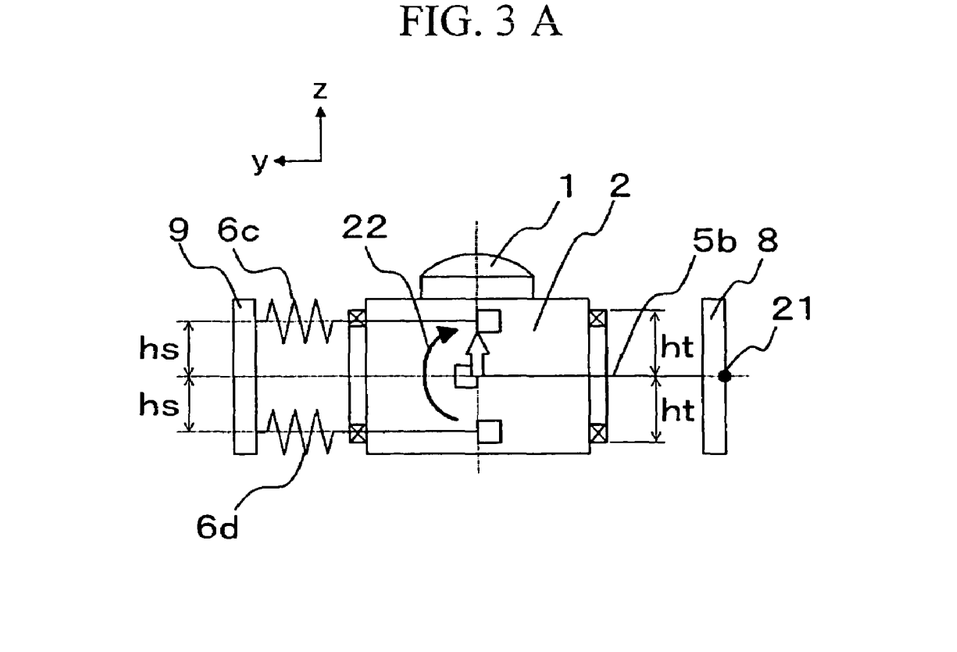
FIG. 3A and FIG. 3B show a method for stabilizing the supporting of the lens holder by the rod-shaped elastic support members of the object lens drive unit shown in FIG. 1.
Figure 3B:
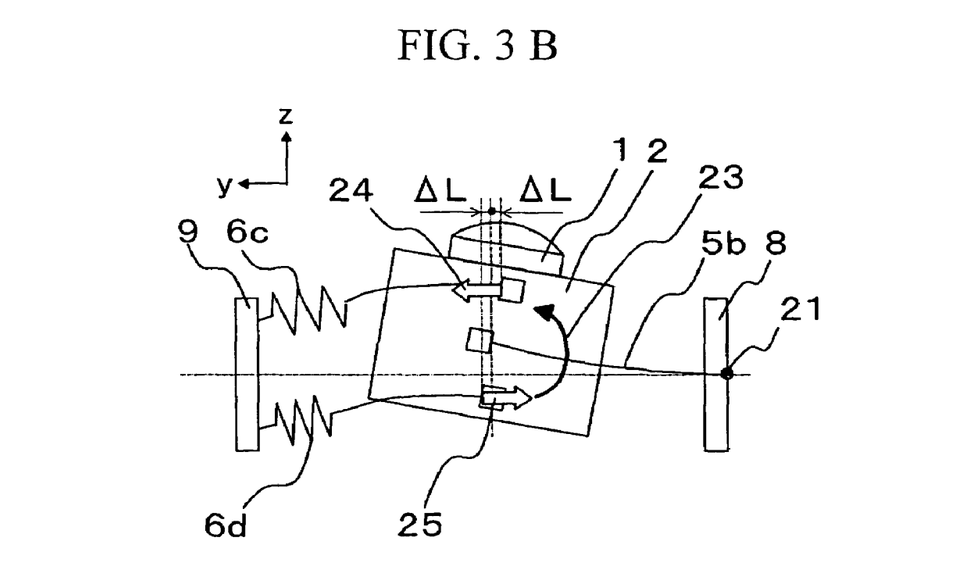

FIG. 3A and FIG. 3B show a method for increasing the stability with which the lens holder can be supported by the rod-shaped elastic support members according to the present embodiment. As shown in FIG. 3A, when the tracking coils 4a to 4d and the first rod-shaped elastic support members 5a and 5b are related as shown, as the moving part is driven in the focusing direction, the first rod-shaped elastic support members 5a and 5b are bent by the moment 22 about the support center 21 of the first fixing portion 8, thereby tilting the object lens 1 in the tangential direction. Such tilting causes the quality of the optical spot to deteriorate, leading to deterioration in a write or read signal. Therefore, when driving in the focusing direction, the object lens 1 should not be tilted. Thus, the parts 6a and 6c of the second rod-shaped elastic support members are attached with a certain distance or more from the first rod-shaped elastic support members 5a and 5b in the focusing direction. Further, the parts 6b and 6d of the second rod-shaped elastic support members are attached symmetrically to the parts 6a and 6c of the second rod-shaped elastic support members in the focusing direction, with respect to the positions where the first rod-shaped elastic support members 5a and 5b are attached. As shown in FIG. 3B, the springiness of these four second rod-shaped elastic support members causes moment 23 in the opposite direction from the aforementioned moment 22, and they thus cancel each other out, whereby the moment as a factor for causing the object lens 1 to be tilted can be reduced. The opposite moment 23 is caused by the mainly axial springiness caused by displacements ΔL in the y-axis direction of the second rod-shaped elastic support members 6a to 6d due to the moment 22: Namely, it is caused by a positive force 24 applied to the upper second rod-shaped elastic support members 6a and 6c in the y-axis direction, and by a negative force 25 applied to the lower second rod-shaped elastic support members 6b and 6d in the y-axis direction.

As a result of such mechanism, it becomes possible to drive the object lens 1 in the focusing direction in a translational manner without disturbing the behavior of the object lens 1, as long as the moment produced by the parts 6a and 6c of the second rod-shaped elastic support members disposed above the first rod-shaped elastic support members 5a and 5b is substantially equal to the moment produced by the parts 6b and 6d of the second rod-shaped elastic support members disposed below the first rod-shaped elastic support members 5a and 5b. Therefore, the number or the springiness of the upper second rod-shaped elastic support members 6a and 6c and the lower second rod-shaped elastic support members 6b and 6d, or their distance from the first rod-shaped elastic support members 5a and 5b, should be properly adjusted such that the upper moment and the lower moment become equal. In the present embodiment, the springiness of the four second rod-shaped elastic support members 6a to 6d is made uniform by forming them in the identical shape. Further, by disposing them symmetrically in the focusing direction with respect to the first rod-shaped elastic support members 5a and 5b, the upper and lower moments are made equal, thereby simply satisfying the aforementioned condition.

The third rod-shaped elastic support members 7a and 7b are attached at positions at a certain distance in the tracking direction (y-axis direction) from where the first rod-shaped elastic support members 5a and 5b are attached, such that the aforementioned positional relationship among the second rod-shaped elastic support members 6a to 6d is not influenced. As a result of such arrangement, the third rod-shaped elastic support members 7a and 7b are not restricted in terms of shape or the like. They also become resistant to variations in the way they are attached, whereby an improved ease of assembly can be achieved. If the springiness of the third rod-shaped elastic support members 7a and 7b is sufficiently smaller than that of the second rod-shaped elastic support members 6a to 6d (such as 1/10 or smaller), the aforementioned moment balance would not be disturbed and so the positions where the third rod-shaped elastic support members 7a and 7b are attached can be freely selected. Further, the shape or position of the individual rod-shaped elastic support members may be designed such that the upper and lower moments with respect to the first rod-shaped elastic support members 5a and 5b become equal when the second rod-shaped elastic support members 6a to 6d and the third rod-shaped elastic support members 7a and 7b are considered as a whole.

By providing the first rod-shaped elastic support members 5a and 5b, the second rod-shaped elastic support members 6a to 6d, and the third rod-shaped elastic support members 7a and 7b with electric conductivity, it becomes possible to make them double as lead wires for supplying current to the focusing coils 3a and 3b, the tracking coils 4a to 4d, the radial tilt coils 13a and 13b, and the tangential tilt coils 14a to 14d. In this way, an object lens drive unit can be provided in which the number of components is reduced, that is low-cost, and in which an improved ease of assembly is ensured.

Figure 4:
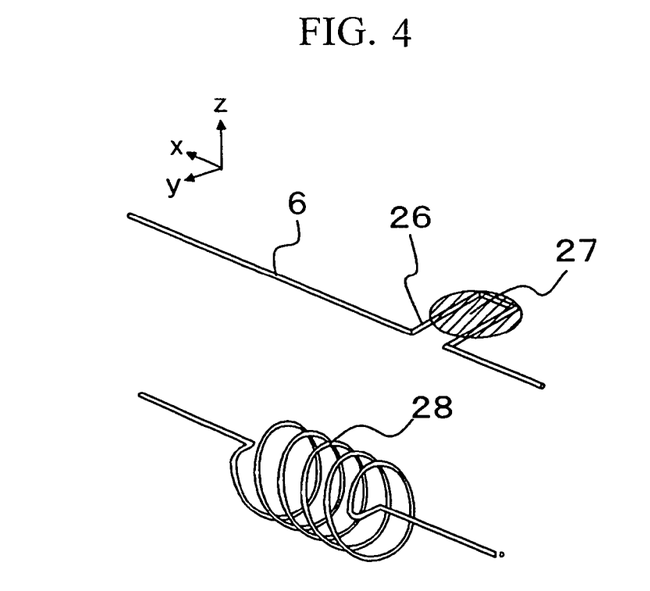
FIG. 4 shows the shape of the second rod-shaped elastic support members and the third rod-shaped elastic support members of the object lens drive unit shown in FIG. 1.

FIG. 4 shows in detail the shape of the second rod-shaped elastic support members 6a to 6d and the third rod-shaped elastic support members 7a and 7b. As shown in FIG. 4, a bend portion 26 is provided at a part of the rod-shaped elastic support member. A viscoelastic material 27 such as silicone is applied in such a manner as to sandwich the bend portion 26, thereby providing it with damping and reducing the stiffness of the rod in the axial direction. Damping may also be provided by applying the viscoelastic material between the rod-shaped elastic support member and a fixing holder 11, instead of applying it across the rod-shaped elastic support member. Alternatively, the axial stiffness may be reduced by providing a coil portion 28 or the like at a part of the rod-shaped elastic support member.

Second Embodiment

A second embodiment of the object lens drive unit according to the invention will be described. The object lens drive unit according to the present embodiment is characterized in that the second rod-shaped elastic support members 6a to 6d and the third rod-shaped elastic support members 7a and 7b differ from those of the first embodiment in shape and fixing structure. The other portions are configured similarly to those of the object lens drive unit according to the first embodiment.

Figure 5:
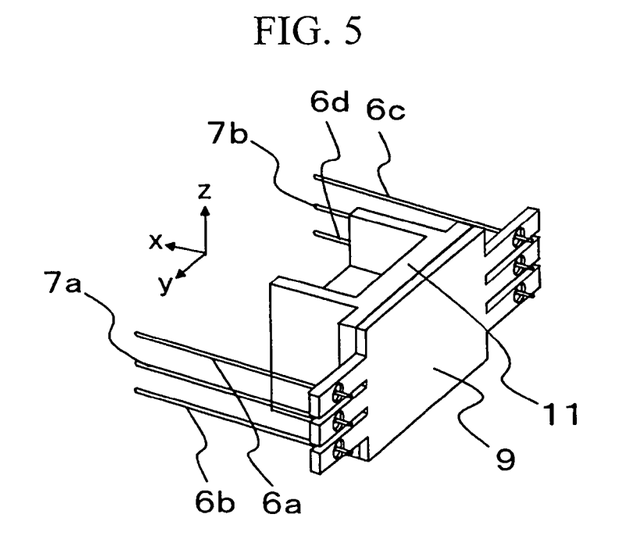
FIG. 5 schematically shows how the second rod-shaped elastic support members and the third rod-shaped elastic support members in the object lens drive unit according to a second embodiment of the invention are fixed.

FIG. 5 schematically shows the structure in which the second rod-shaped elastic support members 6a to 6d and the third rod-shaped elastic support members 7a and 7b are fixed in the object lens drive unit according to the present embodiment. In FIG. 5, neither the second rod-shaped elastic support members 6a to 6d nor the third rod-shaped elastic support members 7a and 7b are provided with a structure for reducing their axial stiffness. Meanwhile, one ends of the second rod-shaped elastic support members 6a to 6d and the third rod-shaped elastic support members 7a and 7b are retained by a cantilever-shaped second fixing portion 9 having a slit. The cantilever-shaped portion of the second fixing portion 9 is provided with springiness. Therefore, the second rod-shaped elastic support members 6a to 6d and the third rod-shaped elastic support members 7a and 7b can be formed of material with a large stiffness in the axial direction, such as straight wires, and also the cost of the rod-shaped elastic support members can be reduced. Further, as in the foregoing, the fixing portion holder 11 may be configured with the same structure with that of the damping holder 10, and it may be filled with a viscoelastic material such as silicone gel, thereby providing damping.

Third Embodiment

A third embodiment of the object lens drive unit according to the invention will be described. The object lens drive unit in the present embodiment differs from the first embodiment in the positions at which the first rod-shaped elastic support members 5a and 5b, the second rod-shaped elastic support members 6a to 6d, and the third rod-shaped elastic support members 7a and 7b are fixed on the lens holder 2. The other portions are configured similarly to those of the object lens drive unit according to the first embodiment.

Figure 6:
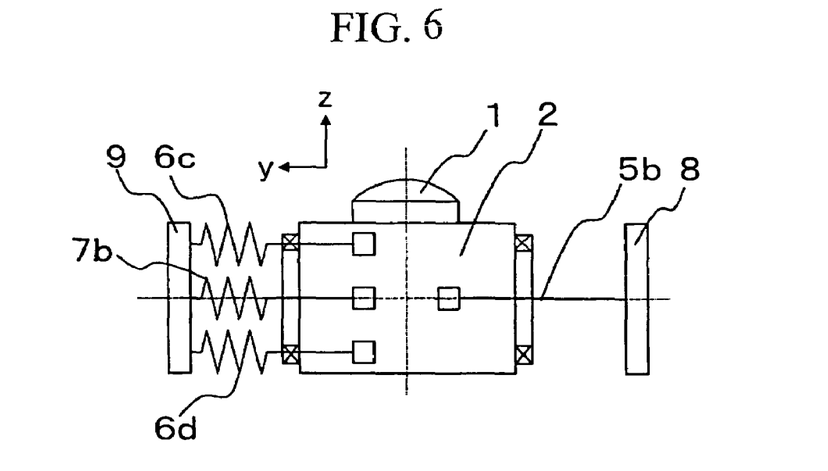
FIG. 6 schematically shows the positions at which the first rod-shaped elastic support members, the second rod-shaped elastic support members, and the third rod-shaped elastic support members of the object lens drive unit according to a third embodiment of the invention are each fixed on the lens holder.

FIG. 6 schematically shows the positions at which the first rod-shaped elastic support members 5a and 5b, the second rod-shaped elastic support members 6a to 6d, and the third rod-shaped elastic support members 7a and 7b in the object lens drive unit according to the present embodiment are fixed on the lens holder 2. In FIG. 6, the positions at which the first rod-shaped elastic support members 5a and 5b, the second rod-shaped elastic support members 6a to 6d, and the third rod-shaped elastic support members 7a and 7b are attached on the lens holder 2 are the same as those of the first embodiment as far as the focusing direction (z-axis direction) is concerned. However, in the tracking direction (y-axis direction), the first rod-shaped elastic support members 5a and 5b, the second rod-shaped elastic support members 6a to 6d, and the third rod-shaped elastic support members 7a and 7b are disposed at an interval from each other. As a result of such configuration, the positions at which the first rod-shaped elastic support members 5a and 5b are attached and the positions at which the third rod-shaped elastic support members 7a and 7b are attached on the sides of the lens holder 2 do not overlap in the x-axis direction. This makes it possible to dispose all of the first to the third rod-shaped elastic support members in the substantially identical yz plane, whereby the thickness of the object lens drive unit in the y-axis direction can be reduced. Further, because the second rod-shaped elastic support members 6a to 6d and the third rod-shaped elastic support members 7a and 7b can be made common, an improved ease of assembly and cost reduction can be achieved. Furthermore, an opening can be provided in the interval on the side of the lens holder 2 through which the optical axis can be passed, whereby the thickness of the object lens drive unit can be reduced.

Fourth Embodiment

A fourth embodiment of the object lens drive unit according to the invention will be describe. The object lens drive unit in the present embodiment differs from the first embodiment in the positions at which the second rod-shaped elastic support members 6a to 6d and the third rod-shaped elastic support members 7a and 7b are supported at the second fixing portion 9. The other portions are configured in the same way as the object lens drive unit according to the first embodiment.

Figure 10:
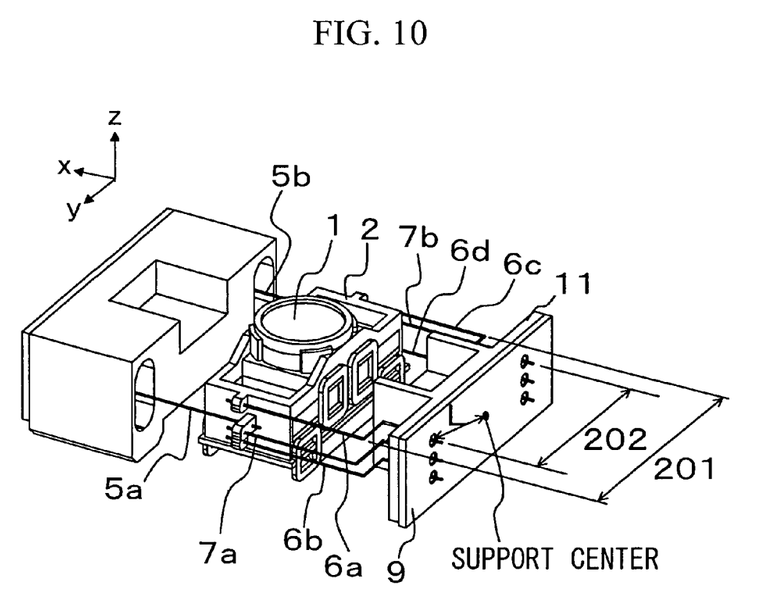
FIG. 10 schematically shows the positions at which the second rod-shaped elastic support members of the object lens drive unit according to a fourth embodiment of the invention are supported.

FIG. 10 schematically shows the positions at which the second rod-shaped elastic support members 6a to 6d and the third rod-shaped elastic support members 7a and 7b are supported at the second fixing portion 9 in the object lens drive unit according to the present embodiment. In FIG. 10, the second rod-shaped elastic support members 6a to 6d and the third rod-shaped elastic support members 7a and 7b are partly provided with a bend portion or the like so as to reduce their axial stiffness. A tracking direction support interval 201 at the end toward the lens holder retaining side is made wider than a tracking direction support interval 202 on the other end. In order to increase the tilting in the object lens radial tilt direction (radial tilt drive sensitivity) per input current or voltage to the radial tilt coils 13a and 13b, in a simple method, rotational stiffness due to the support members in the radial tilt direction can be reduced. The rotational stiffness due to the support members in the radial tilt direction is expressed by kb·L, where kb is the bending stiffness of a support member, and L is the distance between the center of support and a support position. Namely, the rotational stiffness can be easily reduced by decreasing the distance L between the support center and the support position, whereby the radial tilt drive sensitivity can be improved. Regarding the distance L between the support center and the support position, by concentrating the support positions toward the support center in the positional relationship on the side of the fixing portion 9, the object lens drive unit can be reduced in size as compared with the first embodiment.

The second rod-shaped elastic support members 6a to 6d are partly provided with a bend portion or the like so as to reduce their axial stiffness. By making the focusing direction support interval of the end toward the lens holder retaining side wider than the focusing direction support interval on the other end, an effect similar to the effect in the tracking direction can be achieved in the tangential tilt direction.

Example of Configuration of the Optical Pickup

Figure 7:
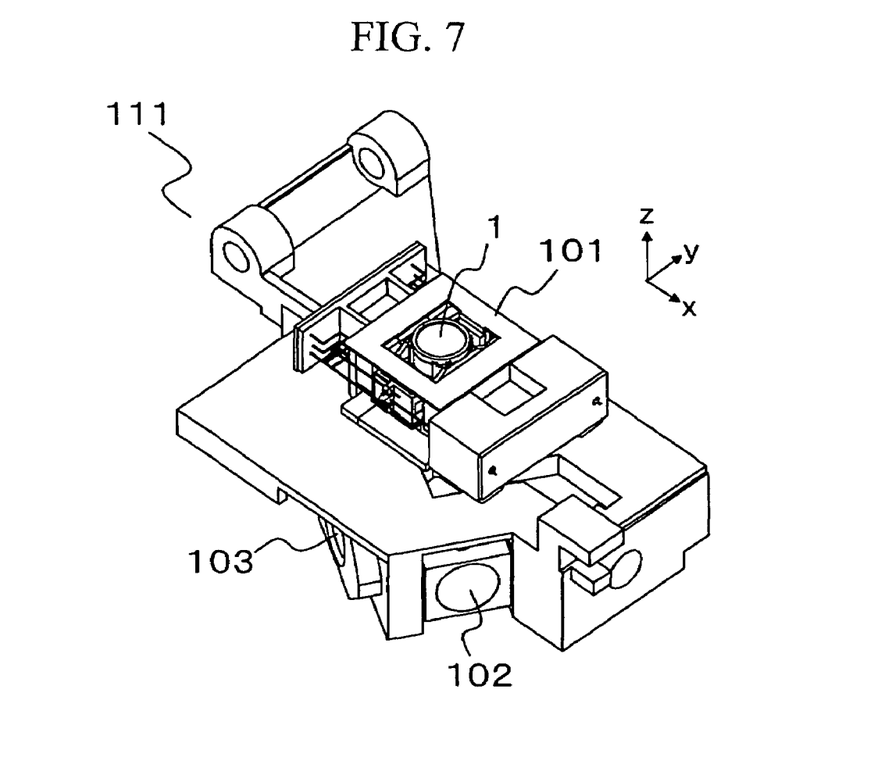
FIG. 7 shows an example of an optical pickup in which the object lens drive unit of the invention is mounted.

FIG. 7 shows an example of the configuration of an optical pickup in which the object lens drive unit according to the invention is mounted. In FIG. 7, an optical pickup 111 includes an object lens drive unit 101 including an object lens 1, and light-emitting elements 102 and 103. In this optical pickup 111, write/read light emitted by the light-emitting elements 102 and 103 is focused by the object lens 1 on the optical disc. Thus, by using the object lens drive unit of the invention, the optical pickup 111 suitable for high-density recording can be configured. While the foregoing example involves a pickup in which the object lens drive unit according to the first embodiment is used, an optical pickup can be similarly configured with an object lens drive units according to any of the other embodiments.

Example of the Configuration of the Optical Disc Drive

Figure 8:
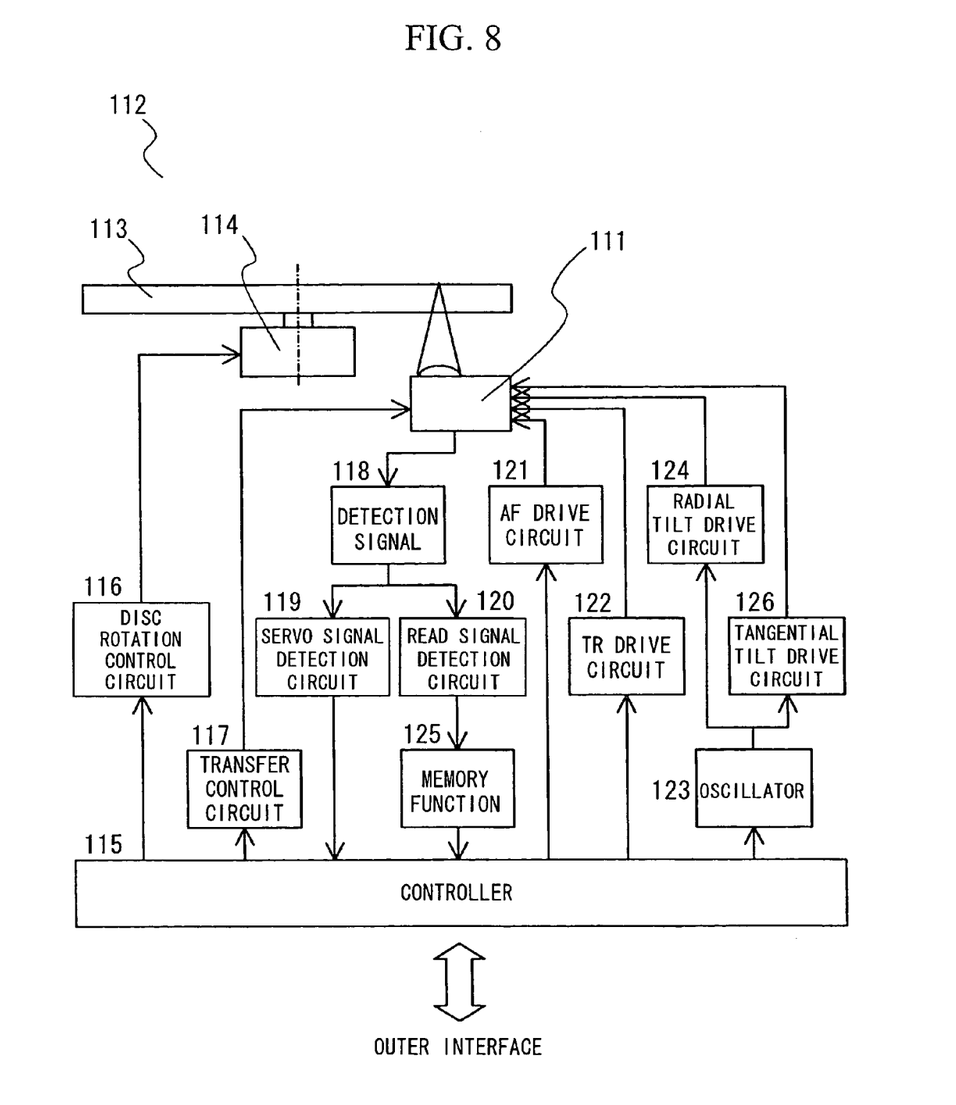
FIG. 8 shows an example of an optical disc drive in which the optical pickup shown in FIG. 7 is mounted.

FIG. 8 shows an example of the configuration of an optical disc drive in which the foregoing optical pickup is mounted. In FIG. 8, an optical disc drive 112 includes a spindle motor 114 for rotating an optical disc 113, an optical pickup 111, a feed mechanism for rotating the optical pickup 111 in the radial direction of the optical disc 113, and a controller 115 for controlling them. The controller 115 is connected with a rotation control circuit 116 for the spindle motor 114, which performs rotation control of an optical disc 113 attached to the spindle motor 114. The controller 115 is connected with a feed control circuit 117 for the optical pickup 111, whereby feed control for moving the optical pickup 111 in the radial direction of the optical disc 113 is performed. Various signals 118 detected by the optical pickup are sent to the servo signal detection circuit 119 and the read signal detection circuit 120. The servo signal detection circuit 119 produces a focus error signal and a tracking error signal. Position control of the object lens 1 in the focusing direction and the tracking direction is performed in accordance with signals from the focusing drive circuit 121 and the tracking drive circuit 122, together with an instruction from the controller 115.

Figure 9:
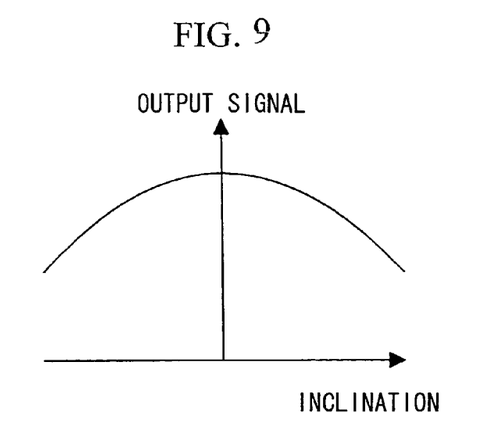
FIG. 9 shows the output signal due to the inclination between the optical disc and the object lens in the optical disc drive shown in FIG. 8.

FIG. 9 shows the output signal due to the inclination between the optical disc 113 and the object lens 1. As shown in FIG. 9, the output signal becomes maximum when there is no inclination between the optical disc 113 and the object lens 1. Using this phenomenon, the inclination between the optical disc 113 and the object lens 1 can be reduced by determining an angle of the object lens 1 such that a maximum output is obtained when the object lens 1 is inclined in the radial direction or the tangential direction. Namely, the radial tilt drive circuit 124 is driven via the oscillator 123, output signals obtained during a complete round around the optical disc 113 are temporarily stored in a memory function 125, and an optimum radial tilt drive current is determined. Similarly, a tangential tilt drive circuit 126 is driven via an oscillator 123, and output signals obtained during a complete round around the optical disc 113 are temporarily stored in the memory function 125, so as to determine an optimum tangential tilt drive current. By applying the radial tilt and tangential tilt drive currents to the radial tilt drive circuit 124 and the tangential drive circuit 126 again, the inclination between the optical disc 113 and the object lens 1 can be reduced. In this way, an optical disc drive 112 suitable for higher densities can be realized. The aforementioned function for determining the optimum drive current may involve the sampling of the inner-most track and the outer-most track of the optical disc 113 and linear approximations. By sampling the optical disc 113 at three or more locations, and then finding an approximation formula of an n-th order function, the inclination between the optical disc 113 and the object lens 1 throughout the surface of the optical disc 113 can be reduced.

While the invention has been described with reference to specific embodiments, the invention is not limited to the foregoing embodiments. A person skilled in the art would be able to change or improve the structure or functions of the embodiments of the invention in various ways without departing from the scope and spirit of the invention.

What is claimed is:

1. An object lens drive unit comprising:
an object lens for focusing light on a recording surface of an optical disc;
a lens holder for holding the object lens;
a pair of first rod-shaped elastic support members for supporting the lens holder;
at least two pair of second rod-shaped elastic support members that support the lens holder on the opposite side from the first rod-shaped elastic support members with respect to the tangential direction;
a drive means for the lens holder, the drive means comprising:
a focusing coil and a tracking coil for driving the lens holder in a direction towards or away from the optical disc and in a radial direction of the optical disc;
a radial tilt coil and a tangential tilt coil for causing the lens holder to be inclined in a radial direction and a tangential direction of the optical disc; and
a magnetic circuit;
wherein the position at which the lens holder is supported by the first rod-shaped elastic support members in the focusing direction substantially coincides with the position of the center point of the tracking coil in the focusing direction;
wherein the at least two pairs of second rod-shaped elastic support members have a smaller axial stiffness than the first rod-shaped elastic support members; and
wherein the position at which one of the at least two pairs of the second rod-shaped elastic support members support the lens holder in the focusing direction and the position at which another of the at least two pairs of the second rod-shaped elastic support members supports the lens holder in the focusing direction are substantially symmetric with respect to the point at which the first rod-shaped elastic support members support the lens holder.

2. An object lens drive unit comprising:
an object lens for focusing light on a recording surface of an optical disc;
a lens holder for holding the object lens;
a pair of first rod-shaped elastic support members for supporting the lens holder;
at least two pairs of second rod-shaped elastic support members that support the lens holder on the opposite side from the first rod-shaped elastic support members with respect to the tangential direction;
a drive means for the lens holder, the drive means comprising:
a focusing coil and a tracking coil for driving the lens holder in a direction towards or away from the optical disc and in a radial direction of the optical disc;
a radial tilt coil and a tangential tilt coil for causing the lens holder to be inclined in a radial direction and a tangential direction of the optical disc; and
a magnetic circuit;
wherein the point at which the lens holder is supported by the first rod-shaped elastic support members substantially coincides with the geometric center or the center of gravity of the tracking coil;
wherein the at least two pairs of second rod-shaped elastic support member have a smaller axial stiffness than the first rod-shaped elastic support members; and
wherein the position at which one of the at least two pairs of the second rod-shaped elastic support members support the lens holder in the focusing direction and the position at which another of the at least two pairs of the second rod-shaped elastic support members supports the lens holders in the focusing direction are substantially symmetric with respect to the point at which the first rod-shaped elastic support members support the lens holder.

3. The object lens drive unit according to claim 1 or 2, comprising a pair of third rod-shaped elastic support members that support the lens holder on the opposite side from the first rod-shaped elastic support members with respect to the tangential direction, wherein the third rod-shaped elastic support members have a smaller axial stiffness than the first rod-shaped elastic support members,
wherein the position at which the third rod-shaped elastic support members support the lens holder in the focusing direction substantially coincides with the position at which the first rod-shaped elastic support members support the lens holder in the focusing direction.

4. The object lens drive unit according to claim 3,
wherein the point at which the at least two pairs of the second rod-shaped elastic support members support the lens holder, the point at which the third rod-shaped elastic support members support the lens holder, and the point at which the first rod-shaped elastic support members support the lens holder do not lie in the same plane perpendicular to the tangential direction.

5. The object lens drive unit according to claim 3,
wherein the first rod-shaped elastic support members, the at least two second of second rod-shaped elastic support members, and the third rod-shaped elastic support members are made of electrically conductive material, wherein they each supply current to the focusing coil, the tracking coil, the radial tilt coil, or the tangential tilt coil.

6. The object lens drive unit according to claim 1 or 2, wherein the end of the at least two pairs of second rod-shaped elastic support members opposite to the end thereof at which the lens holder is supported is supported by a fixing portion, wherein the interval of two points at which each pair of the second rod-shaped elastic support members is supported by the fixing portion is narrower than the interval of the two points at which each pair of the second rod-shaped elastic support members support the lens holder.

* * * * *